United States Patent [19]

Kugele et al.

[11] Patent Number: 4,617,334

[45] Date of Patent: Oct. 14, 1986

[54] STABILIZER COMPOSITIONS FOR PVC

[75] Inventors: Thomas G. Kugele; Keith A. Mesch; Karl R. Wursthorn, all of Cincinnati, Ohio

[73] Assignee: Morton Thiokol, Inc., Chicago, Ill.

[21] Appl. No.: 654,580

[22] Filed: Sep. 24, 1984

Related U.S. Application Data

[63] Continuation of Ser. No. 406,586, Aug. 9, 1982, abandoned.

[51] Int. Cl.$^4$ ............ C08K 5/36; C08K 5/37; C08K 5/56; C08K 5/58
[52] U.S. Cl. ............ 524/177; 524/180; 524/181; 524/182; 524/289; 524/302; 524/330; 524/301; 524/392; 252/400.54
[58] Field of Search ............ 252/400; 524/177, 180, 524/181, 182, 289, 302, 330, 301, 392

[56] References Cited

U.S. PATENT DOCUMENTS

| | | | |
|---|---|---|---|
| 3,167,527 | 1/1965 | Hechenbleikner et al. | 524/180 |
| 3,503,924 | 3/1970 | Pollock | 524/180 |
| 3,507,827 | 4/1970 | Pollock | 524/180 |
| 3,972,908 | 8/1976 | Collins et al. | 524/180 |
| 4,029,618 | 6/1977 | Dieckmann | 524/177 |
| 4,122,064 | 10/1978 | Scheidl et al. | 524/180 |
| 4,256,618 | 3/1981 | Brecker et al. | 524/180 |
| 4,269,731 | 5/1981 | Mack | 524/301 |
| 4,303,578 | 12/1981 | Michaelis | 524/180 |
| 4,315,850 | 2/1982 | Kugele | 524/180 |
| 4,336,168 | 6/1982 | Hoch et al. | 524/302 |
| 4,391,757 | 7/1983 | Kugele et al. | 524/302 |
| 4,440,891 | 4/1984 | Taylor et al. | 524/330 |

FOREIGN PATENT DOCUMENTS

| | | |
|---|---|---|
| 2434835 | 3/1980 | France . |
| 52-38556 | 3/1977 | Japan . |
| 54-66954 | 5/1979 | Japan . |
| 56-00844 | 6/1979 | Japan . |
| 56-844 | 1/1981 | Japan . |

*Primary Examiner*—Veronica P. Hoke
*Attorney, Agent, or Firm*—Richard J. Sheridan; Gerald K. White

[57] ABSTRACT

Compositions which are effective in stabilizing polymers against the deteriorative effects of heat are provided comprising (1) an organic antimony compound or mixture of organic antimony compounds, (2) a mercaptan-containing organic compound or mixture of mercaptan-containing organic compounds, and (3) a metal mercaptoalcohol or mixture of metal mercaptoalcohols. Also provided are polymer compositions containing said stabilizers, a process for stabilizing polymers, and articles of manufacture made from stabilized polymer compositions.

8 Claims, No Drawings

STABILIZER COMPOSITIONS FOR PVC

This is a continuation of application Ser. No. 406,586 filed on Aug. 9, 1982, now abandoned.

FIELD OF THE INVENTION

This invention relates to stabilizer compositions containing (1) an organic antimony compound, or mixture of organic antimony compounds, (2) a mercaptan-containing organic compound or mixture of mercaptan-containing organic compounds, and (3) a metal mercaptoalcohol or mixture of metal mercaptoalcohols. This invention also relates to polymer compositions containing said stabilizer compositions, to methods for stabilizing polymers by adding thereto said stabilizer compositions, and to articles of manufacture, e.g. pipe, made from said stabilized polymer compositions.

BACKGROUND OF THE INVENTION

Organotin compounds, particularly useful as stabilizers for halogen containing polymers, are well known in the art. These organotin compounds can provide stabilization of such polymers when used alone or in combination with various compounds. For example, U.S. Pat. No. 3,503,924 to M. W. Pollock discloses stabilizers for polyvinyl chloride resin which are mixtures containing a diorganotin mercaptide and a minor amount of an alpha-mercapto acid. Pollock also discloses, in U.S. Pat. No. 3,507,827, stabilizer combinations for decreasing early discoloration of polyvinyl chloride resins which contain (1) a dialkyl, dicycloalkyl or alkylcycloalkyl tin mercapto carboxylic acid ester, and (2) an alpha- or beta-mercapto acid having at least three carbon atoms, or an alpha- or beta-mercapto alcohol having at least two carbon atoms.

Organoantimony compounds are also known in the art as stabilizers for halogen-containing polymers. For example, U.S. Pat. No. 4,256,618 to Brecker et al discloses stabilizers containing an antimony mercaptocarboxylic acid or ester in combination with a mercaptocarboxylic acid ester. The antimony mercaptocarboxylic acid or ester have the general formula:

$[R_1]_{3-n_1} + n_2$ or

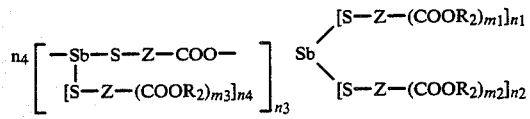

in which (1) $R_1$ is selected from the group consisting of organic groups of the formula —$SR_3OH$ and —$OR_3SH$, where $R_3$ is alkylene having from two to about eight carbon atoms; and S—Z—$(COOR_2)_m$ groups;

(2) $R_2$ is selected from the group consisting of hydrogen, alkyl, alkylene, alkenyl, aryl, arylene, mixed alkyl-aryl, mixed aryl-alkyl, cycloaliphatic, and heterocyclic containing one or more sulfur, oxygen or nitrogen ring atoms and having from about one to about twelve carbon atoms, and such groups containing ester groups, alkoxy groups, hydroxyl groups, and halogen atoms;

(3) S—Z—$COOR_2$ is a mercaptocarboxylic acid or ester group;

(4) $n_1$, $n_2$ and $n_4$ are the number of S—Z—$COOR_2$ groups, and are integers from 0 to 2; but at least one of $n_1$ and $n_2$ is 1 or 2;

(5) $n_3$ is the number of

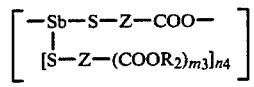

groups, and is a number from 0 to 10, and preferably from 0 to 1;

(6) $m_1$, $m_2$ and $m_3$ are the number of $COOR_2$ groups, and are integers from 1 to 6;

(7) Z is selected from the group consisting of bivalent alkylene radicals having from one to about five carbon atoms, carrying the S group in a position alpha or beta to a $COOR_2$ group; and such radicals containing free carboxylic acid, carboxylic ester, and carboxylic acid salt groups and mercapto groups.

The —S—Z—$(COOR_2)_m$ and —S—Z—COO— groups are derived from mono- or poly- alpha- and beta-mercapto carboxylic acids and esters by removal of the hydrogen atom of the mercapto group. The S—Z—$(—COOR_2)_m$ and —S—Z—COO— groups can be the same or different in the antimony compound, and the former if different can be all acid ($R_2$ is H), all ester ($R_2$ is other than H), or mixed acid and ester groups. The groups include the aliphatic acids and esters which contain at least one mercapto group, such as, for example, mercaptoacetic acid, alpha- and beta-mercaptopropionic acid, alpha- and beta-mercaptobutyric acid, alpha- and beta-mercaptovaleric acid, alpha- and beta-mercaptohexanoic acid, thiomalic acid, alpha- and beta-mercaptoadipic acid, and alpha- and beta-mercaptopimelic acid, and the $R_2$ esters of each of these. Thus, the antimony mercaptocarboxylic acid or ester must have at least one —[S—Z—$(COOR_2)_{m_1}$] group attached to an antimony atom. They may also have an —$SR_3OH$ group bonded to an antimony atom, although this type of group is not required.

Brecker et al disclose that other components may be added to the antimony mercaptocarboxylic acid or ester and mercaptocarboxylic acid ester. These additional components include ortho-dihydric phenols, alkaline earth metal carboxylates, epoxidized triglyceride esters and tin salts of medium and high molecular weight phenols. Brecker et al do not, however, suggest mixtures of an antimony mercaptocarboxylic acid or ester, a mercaptocarboxylic acid ester, and a metal mercaptoalcohol. While they do disclose that an antimony mercaptoalcohol (ie. a compound according to the above general formula where an —$SR_3OH$ group is bonded to an antimony atom) can be employed with a mercaptocarboxylic acid ester, they failed to recognize the dramatic improvement in stabilization achieved by the combination of (1) an organic antimony compound or mixture of organic antimony compounds having at least one antimony atom and at least one antimony to sulfur to carbon linkage wherein the sulfur to carbon part of each antimony to sulfur to carbon linkage is derived from the group consisting of mercaptides, mercaptoacids, mercaptoesters, mercaptoalkylesters of carboxylic acids and mixtures thereof; (2) a mercaptocarboxylic acid ester; and (3) a metal mercaptoalcohol or mixture of metal mercaptoalcohols.

SUMMARY OF THE INVENTION

In accordance with this invention there are provided compositions for stabilizing halogen-containing organic polymers which comprise (1) an organic antimony compound or mixture of organic antimony compounds, (2) a mercaptan-containing organic compound or mixture of mercaptan-containing organic compounds, and (3) a metal mercaptoalcohol or mixture of metal mercaptoalcohols. The invention is also directed to polymer compositions containing a stabilizing composition comprising (1) an organic antimony compound or mixture of organic antimony compounds, (2) a mercaptan-containing organic compound or mixture of mercaptan-containing organic compounds, and (3) a metal mercaptoalcohol or mixture of metal mercaptoalcohols, to a process for stabilizing polymers comprising adding thereto a stabilizing composition comprising (1) an organic antimony compound or mixture of organic antimony compounds, (2) a mercaptan-containing organic compound or mixture of mercaptan-containing organic compounds, and (3) a metal mercaptoalcohol or mixture of metal mercaptoalcohols, and to articles of manufacture, e.g. pipe, made from polymers containing a stabilizing composition (1) an organic antimony compound or mixture of organic antimony compounds, (2) a mercaptan-containing organic compound or mixture of mercaptan-containing organic compounds, and (3) a metal mercaptoalcohol or mixture of metal mercaptoalcohols.

DETAILED DESCRIPTION OF THE PREFERRED EMBODIMENT

The stabilizer compositions of this invention have quite unexpectedly been found to impart stabilization against the deteriorative effects of heat to halogen-containing organic polymers which is superior to those stabilizer compositions previously known in the art.

Organic polymers normally susceptible to thermal deterioration (i.e. heat induced degradation) are generally useful in the practice of the polymer compositions of this invention. In view of their similar thermal behavior, i.e. discoloration, during elevated temperature processing and their similar capacity to dehydrohalogenate, various halogen-containing organic polymers such as vinyl halide and vinylidene halide homopolymers and copolymers could be expected to be useful in the practice of this invention. Especially preferred to be used in the polymer composition of this invention is a homopolymer or copolymer or mixture thereof of a vinyl chloride or vinylidene chloride monomer. Mixtures of organic polymers at least one of which is a homopolymer or copolymer of a vinyl halide or vinylidene halide monomer may also be used in the practice of the polymer composition of this invention. Among the halogen containing organic polymers considered to be useful in the practice of the polymer composition of this invention there are included, for example, halogenated olefin homopolymers, halogenated olefin copolymers, vinyl halide homopolymers, vinyl halide copolymers, vinylidene halide homopolymers, vinylidene halide copolymers and polymer mixtures containing said halogen containing organic polymers.

As vinyl halide homopolymers, vinyl halide copolymers and polymer blends containing vinyl halide homopolymers, vinyl halide copolymers and polymer blends containing vinyl halide homopolymers or vinyl halide copolymers there, for example, include (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate, and other alkyl acrylates, methyl methacrylate, ethyl methacrylate, butyl methacrylate, hydroxyethyl methacrylate and other alkyl methacrylates, methyl alpha chloroacrylate, styrene, vinyl ethers such as vinyl ethyl ether, vinyl chloroethyl ether, vinyl phenyl ether, vinyl ketones such as vinyl methyl ketone, vinyl phenyl ketone, 1-fluoro-1-chloroethylene, acrylonitrile, chloroacrylonitrile, allylidene diacetate, chloroallylidene diacetate, ethtylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylmethacrylate, polyvinyl chloride and polystyrene, polyvinyl chloride and acrylonitrile-butadiene-styrene copolymer, and polyvinyl chloride and polyethylene and polymethyl methacrylate. Typical vinyl halide copolymers include vinyl chloride-vinyl acetate (87-13), vinyl chloride-vinylidene chloride (95-5), vinyl chloride-diethylfumarate (95-5), vinyl chloride-trichloroethylene (95-5) and vinyl chloride-2-ethylhexylacrylate (80-20). The polymer blends comprise physical blends of at least two distinct polymeric species and contain from 25 to 95 weight percent of vinyl halide homopolymer. The vinyl halide copolymers are copolymers comprising from 25 to 95 mole percent vinyl halide units.

Other halogen containing polymers may include, for example, chlorinated polyethylene having 14 to 75%, e.g. 27%, chlorine by weight, chlorinated natural and synthetic rubber, chlorinated polystyrene and rubber hydrochloride. The homopolymers and copolymers of vinyl chloride or vinylidene chloride and polymer mixtures containing said homopolymer or copolymers are preferred in the practice of the polymer composition of this invention.

The stabilizer compositions of this invention comprise (1) an organic antimony compound or mixture of organic antimony compounds, (2) a mercaptan-containing organic compound or mixture of mercaptan-containing organic compounds, and (3) a metal mercaptoalcohol or mixture of metal mercaptoalcohols.

The organic antimony compounds useful in the practice of this invention comprise compounds having at least one antimony atom and at least one antimony to sulfur to carbon, ie. Sb—S—C, linkage wherein the sulfur to carbon, ie. S—C, part of each antimony to sulfur to carbon linkage is derived from the group selected from mercaptides, mercaptoacids, mercaptoesters (ie. the reaction product of a mercaptoacid and an alcohol), mercaptoalkylesters of carboxylic acids (ie. the reaction product of a mercaptoalcohol and a carboxylic acid), and combinations thereof. More particularly, the organic antimony compounds of this invention are those compounds having the formula:

or the formula

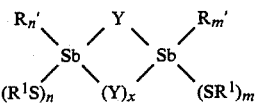 (II)

wherein
R is selected from the group consisting of alkyl, aryl, cycloalkyl, cycloalkenyl, aralkyl, alkaryl, and alkenyl;
$R^1$ is selected from the group consisting of alkyl, aryl, cycloalkyl, cycloalkenyl, aralkyl, alkaryl, alkenyl,

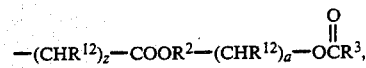

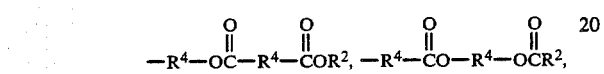

$-R^4-S-R^2$ and $-R^4-O-R^3$;
$R^2$ is hydrogen, alkyl, aryl, alkenyl, cycloalkyl or alkoxyalkyl;
$R^3$ is alkyl, aryl, cycloalkyl or alkenyl;
$R^{12}$ is —H, alkyl, aryl, alkenyl, cycloalkyl; or alkyl, aryl, alkenyl or cycloalkyl substituted with —OH, $-OR^1$,

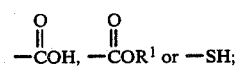

Y is selected from the group consisting of

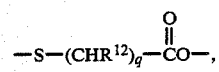

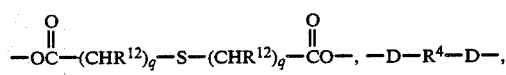

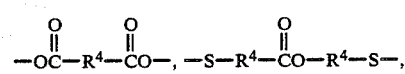

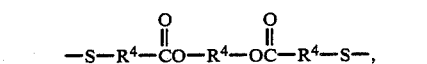

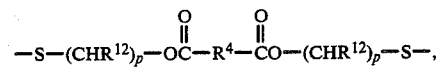

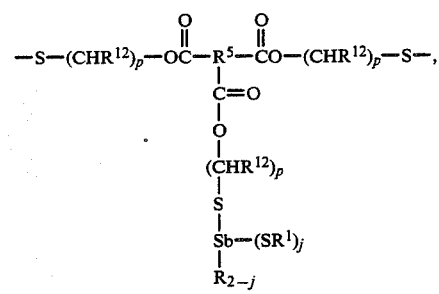

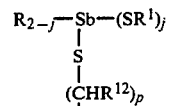

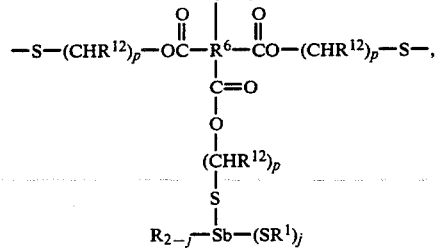

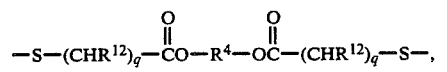

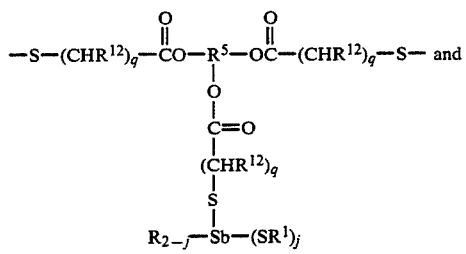

$R^4$ is unsubstituted alkylene, arylene or alkenylene, or alkylene, arylene or alkenylene substituted with one or two R, $-OR^2$,

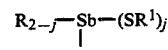
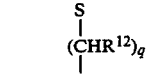

$R^5$ is a trivalent alkyl or aryl radical;
$R^6$ is a tetravalent alkyl or aryl radical;
$R^{40}$ is unsubstituted alkylene, arylene or alkenylene; or alkylene substituted with one or two

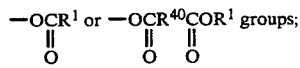

D is oxygen or sulfur;
i = 1, 2 or 3;
j = 1 or 2;

m=1 or 2 and m'=0 or 1;
n=1 or 2 and n'=0 or 1;
x is 0 or 1 with the proviso that when x=0 then m+m'=2 and n+n'=2, and when x=1 then m=1, m'=0, n=1 and n'=0;
z is 1, 2 or 3;
a is 2, 3 or 4;
q is 1, 2 or 3; and
p is 2, 3 or 4; and The preferred organic antimony compounds useful in this invention according to formula (I) are those compounds wherein i=3 and $R^1$ is $(CHR^{12})_z COOR^2$ where $R^{12}$ is —H or alkyl, z=1 or 2 and $R^2$ is alkyl. The preferred organic antimony compounds according to formula (II) are those compounds where Y is

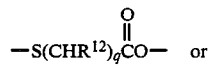 or

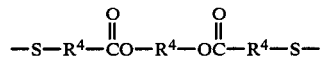

where $R^4$ is alkylene; n' and m' are each 0, n and m are each 2; $R^2$ is $(CHR^{12})_z COOR^2$ where $R^{12}$ is —H or alkyl, z=1 or 2 and $R^2$ is alkyl; and x=o.

Examples of the organic antimony compounds of this invention include, but are not limited to the following:

$CH_3Sb(SC_4H_9)_2$
$Sb(SC_8H_{17})_3$
$(C_8H_{17})_2SbSC_6H_5$
$C_6H_5Sb(SCH_2C_6H_5)_2$
$C_6H_5—CH_2—Sb(SC_6H_4CH_3)_2$

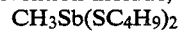
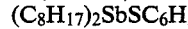
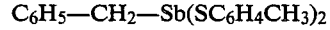
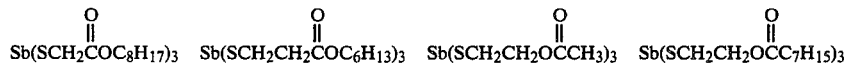
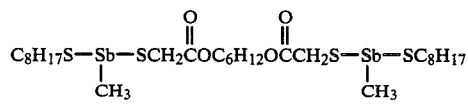
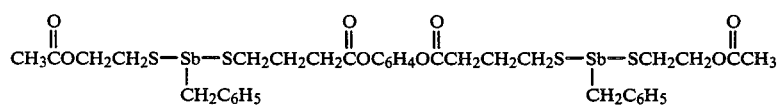
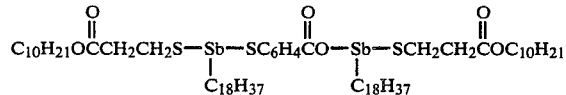

The mercaptan-containing organic compounds useful in this invention include hydrocarbyl mercaptans, mercapto esters, mercaptoalkyl esters of carboxylic acids, mercapto alcohols, and mercapto acids. More particularly, the mercaptan-containing organic compounds of this invention are compounds having the formulas:

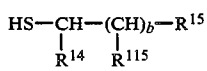 (III)

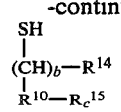 (IV)

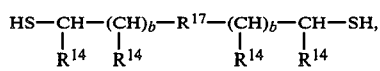 (V)

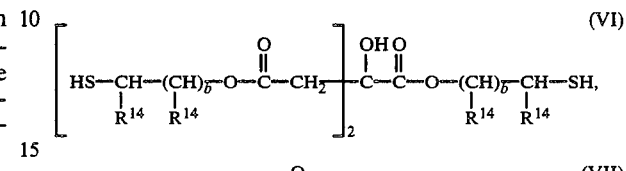 (VI)

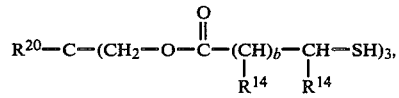 (VII)

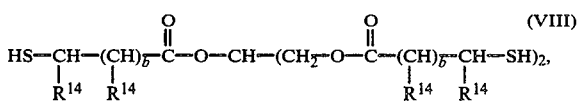 (VIII)

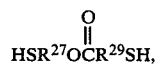 (IX)

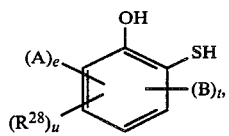 (X)

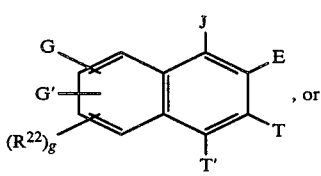 , or (XI)

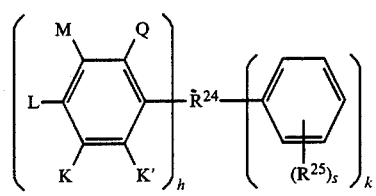

wherein
$R^{10}$ is cycloalkyl, cycloalkenyl or aryl;
$R^{14}$ is —H, aryl or $C_1$ to $C_{18}$ alkyl;
$R^{15}$ and $R^{115}$ are each

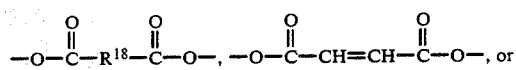

—OH, —SH, aryl, $C_1$ to $C_{18}$ alkyl, or —H;
$R^{16}$ is —H, alkyl, alkenyl, aryl, aralkyl, alkaryl, cycloalkyl or cycloalkenyl;
$R^{17}$ is

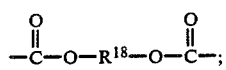

$R^{18}$ is arylene, $C_1$ to $C_8$ alkylene, or

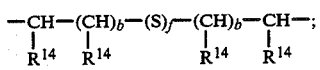

$R^{20}$ is —CH$_3$, —CH$_2$CH$_3$, or

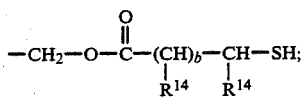

$R^{22}$ is alkyl, alkenyl or halogen;
$R^{24}$ is alkylene or alkenylene;
$R^{25}$ is alkyl, alkenyl, halogen, —SH or —OH;
$R^{27}$ is unsubstituted alkylene, arylene, or alkenylene, or alkylene, arylene, or alkenylene substituted with one or two R, —R$^1$, —OR$^2$,

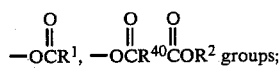

R, $R^1$, $R^2$ and $R^{40}$ are as previously defined;
$R^{28}$ is alkyl, aryl, alkenyl, alkaryl, cycloalkyl, alkoxy or halogen;
$R^{29}$ is $R^{27}$;
A is —H, —OH or —SH;
B is —H, —OH or —SH;
J is —H, —SH, —OH or $R^{26}$;
E is —H, —OH, —SH or $R^{26}$;
T is —H, —SH, —OH or $R^{26}$;
T' is —H, —OH, —SH or $R^{26}$;
$R^{26}$ is alkyl, alkenyl or halogen;
G is —H, —OH or —SH;
G' is —H, —SH or —OH;
K is —H, —SH, —OH or $R^{23}$;
K' is —H, —OH, —SH or $R^{23}$;
L is —H, —SH, —OH or $R^{23}$;
M is —H, —SH, —OH or $R^{23}$;
Q is H, —SH, —OH or $R^{23}$;
$R^{23}$ is alkyl, alkenyl or halogen;
b=0 or an integer from 1 to 6 inclusive;
c=1, 2 or 3;
e=1 or 2;
f=1 or 2;
g=0, 1, 2, or 3;
h=1, 2, 3 or 4;
k=0, 1, 2 or 3;
s=0, 1, 2 or 3;
t=1 or 2;
u=0, 1, 2 or 3;
h+k=2, 3 or 4;
e+t+u=2, 3 or 4;
with the proviso that (1) in formula (XI) two of groups J, E, T and T' must be an —OH grou and an —SH group bonded directly to adjacent ring carbon atoms, (2) in formula (XII) two of groups K, K', L, M and Q must be an —OH group and an —SH group bonded directly to adjacent ring carbon atoms, and (3) in formulas (IV) when $R^{10}$ is aryl, b=0, $R^{15}$ is —OH and c=1, 2 or 3, then the —OH and —SH groups on the aryl are on non-adjacent carbon atoms.

The mercaptan-containing organic compounds useful in this invention are well known compounds (see, for example, U.S. Pat. Nos. 3,503,924 and 3,507,827).

The preferred mercaptan-containing organic compounds useful in this invention are those compounds according to formula (III) where $R^{14}$ is —H, $R^{15}$ is

$R^{16}$ is alkyl, and b=o; those compounds according to formula (IV) where $R^{10}$ is phenyl, $R^{14}$ and $R^{15}$ are —H; and b=1; those compounds according to formula (V) where $R^{14}$ is —H, $R^{17}$ is

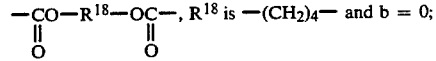

those compounds according to formula (VI) where $R^{14}$ is —H and b=1; those compounds according to formula (VII) where $R^{20}$ is —C$_2$H$_5$ or

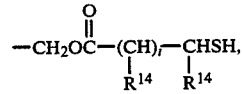

$R^{14}$ is —H and b=1; those compounds according to formula (VIII) where $R^{14}$ is —H and b=1; those compounds according to formula (IX) wherein $R^{27}$ is —CH$_2$CH$_2$— or

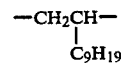

and $R^{29}$ is —CH$_2$— or

−CH−;
|
OH and those compounds according to formula (X) wherein e=0, t=0, and u is either 0 or 1, $R^{28}$ being alkyl when u=1. Of the foregoing, the mercaptan-containing organic compounds according to formula (III) are more preferred.

Examples of mercaptan-containing organic compounds described by formula (III) include, but are not limited to, the following compounds:

$HSC_{12}H_{25}$ $$HSCH_2\overset{O}{\overset{\|}{C}}OC_2H_5$$

$$HSCH_2\overset{O}{\overset{\|}{C}}OC_8H_{17}$$

$$HS\overset{}{\underset{CH_3}{C}}H\overset{O}{\overset{\|}{C}}OC_8H_{17}$$

$$HSCH_2\overset{}{\underset{CH_3}{C}}H O\overset{O}{\overset{\|}{C}}C_8H_{17}$$

$$HS\overset{}{\underset{\text{Ph}}{C}}H\overset{O}{\overset{\|}{C}}OC_{12}H_{25}$$

$$HSCH_2\overset{O}{\overset{\|}{C}}OC_{18}H_{37}$$

$$HSCH_2CH_2\overset{O}{\overset{\|}{C}}OC_8H_{17}$$

$$HSCH_2CH_2\overset{O}{\overset{\|}{C}}OC_{11}H_{23}$$

$$HSCH_2CH_2O\overset{O}{\overset{\|}{C}}C_{17}H_{35}$$

$$HSCH_2CH_2O\overset{O}{\overset{\|}{C}}C_{17}H_{33}$$

$$HSCH_2CH_2CH_2O\overset{O}{\overset{\|}{C}}C_8H_{17}$$

$$HSCH_2\overset{}{\underset{C_9H_{19}}{C}}H O\overset{O}{\overset{\|}{C}}CH_3$$

$$HSCH_2CH_2O\overset{O}{\overset{\|}{C}}C_{11}H_{23}$$

$$HS\overset{}{\underset{C_{10}H_{21}}{C}}H\overset{O}{\overset{\|}{C}}OCH_3$$

$HSCH_2CH_2OH$ $HSCH_2CH_2CH_2OH$ $$HSCH_2\underset{CH_3}{CHOH}$$

$$HSCH_2\underset{C_9H_{19}}{CHOH}$$

$$HSCH_2\overset{O}{\overset{\|}{C}}OH$$

$$HSCH_2CH_2\overset{O}{\overset{\|}{C}}OH$$

$$HS\underset{C_{10}H_{21}}{CH}\overset{O}{\overset{\|}{C}}OH$$

Examples of the mercaptan-containing organic compounds described by formula (IV) include, but are not limited to, the following compounds:

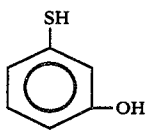

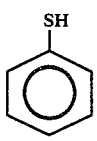

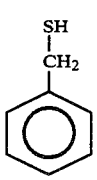

Examples of mercaptan-containing organic compounds represented by formula (V) include, but are not limited to, the following compounds:

$$HSCH_2\overset{O}{\overset{\|}{C}}OCH_2CH_2O\overset{O}{\overset{\|}{C}}CH_2SH$$

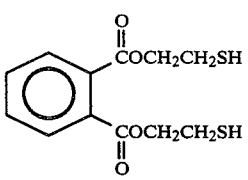

$$HSCH_2CH_2O\overset{O}{\overset{\|}{C}}(CH_2)_4\overset{O}{\overset{\|}{C}}OCH_2CH_2SH$$

-continued $$HSCH_2CH_2OCCH=CHCOCH_2CH_2SH$$
(with two C=O groups)

$$HSCH_2CH_2OCCH_2CH_2COCH_2CH_2SH$$
(with two C=O groups)

An example of the mercaptan-containing organic compounds described by formula (VI) includes, but is not limited to, the following:

$$\left[ HSCH_2CH_2O\overset{O}{\overset{\|}{C}}CH_2 \right]_2 \overset{OH}{\underset{|}{C}}\text{---}\overset{O}{\overset{\|}{C}}OCH_2CH_2SH$$

The mercaptan-containing organic compounds represented by formula (VII) are exemplified by, but are not limited to, the following:

$$CH_3CH_2C(CH_2O\overset{O}{\overset{\|}{C}}CH_2SH)_3$$

The mercaptan-containing organic compounds represented by formula (VIII) are exemplified by, but are not limited to, the following:

$$HSCH_2CH_2\overset{O}{\overset{\|}{C}}OCH(CH_2O\overset{O}{\overset{\|}{C}}CH_2CH_2SH)_2$$

$$HSCH_2\overset{O}{\overset{\|}{C}}OCH(CH_2O\overset{O}{\overset{\|}{C}}CH_2SH)_2$$

The mercaptan-containing organic compounds represented by formula (IX) include, but are not limited to, the following:

$$HSCH_2CH_2O\overset{O}{\overset{\|}{C}}CH_2SH$$

$$HSCH_2CH_2O\overset{O}{\overset{\|}{C}}\underset{\underset{OH}{|}}{C}HSH$$

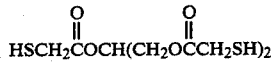

$$HSCH_2\underset{\underset{C_9H_{19}}{|}}{C}H\text{---}O\overset{O}{\overset{\|}{C}}CH_2SH$$

$$HSCH_2\underset{\underset{OH}{|}}{C}HCH_2O\overset{O}{\overset{\|}{C}}\underset{\underset{CH_3}{|}}{C}HSH$$

$$HSCH_2\underset{\underset{\underset{\underset{O}{\|}}{OCCH_3}}{|}}{C}HCH_2O\overset{O}{\overset{\|}{C}}CH_2SH$$

Examples of organic compounds represented by formula (X) include, but are not limited to, the following:
1-hydroxy-2-mercaptobenzene(ortho hydroxythiophenol)
1,3-dihydroxy-2-mercapto benzene
1,4-dihydroxy-2-mercapto benzene
1,5-dihydroxy-2-mercapto benzene
1,6-dihydroxy-2-mercapto benzene
1,3,4-trihydroxy-2-mercapto benzene
1,3,5-trihydroxy-2-mercapto benzene
1,3,6-trihydroxy-2-mercapto benzene
1,4,5-trihydroxy-2-mercapto benzene
1,4,6-trihydroxy-2-mercapto benzene
1,5,6-trihydroxy-2-mercapto benzene
1,3,4,5-tetrahydroxy-2-mercapto benzene
1,3,4,6-tetrahydroxy-2-mercapto benzene
1,4,5,6-tetrahydroxy-2-mercapto benzene
1,3,4,5,6-pentahydroxy-2-mercapto benzene
1-hydroxy-2,3-dimercapto benzene
1-hydroxy-2,4-dimercapto benzene
1-hydroxy-2,6-dimercapto benzene
1-hydroxy-2,3,5-trimercapto benzene
1-hydroxy-2,3,6-trimercapto benzene
1-hydroxy-2,3,4,5-tetramercapto benzene
1-hydroxy-2,3,4,6-tetramercapto benzene
1-hydroxy-2,3,4,5,6-pentamercapto benzene
1,3-dihydroxy-2,4-dimercapto benzene
1,3-dihydroxy-2,6-dimercapto benzene 1,3,5-trihydroxy-2,4-dimercapto benzene
1,3,5-trihydroxy-2,4,6-trimercapto benzene
1-hydroxy-2-mercapto-4-methyl benzene
1,3-dihydroxy-2-mercapto-5,6-dioctyl benzene
1-hydroxy-2-mercapto-4-phenyl benzene
1-hydroxy-2-mercapto-5-cyclohexyl benzene
1,3-dihydroxy-2-mercapto-4-butyl benzene
1-hydroxy-2,6-dimercapto-4-chloro benzene
1-hydroxy-2-mercapto-4,5-dichloro benzene
1-hydroxy-2-mercapto-4-chloro-6-hexyl benzene
1-hydroxy-2-mercapto-3-ethyl-5 isopropyl benzene Organic compounds according to formula (XI) are exemplified by, but are not limited to, the following compounds shown in the following Table I:

TABLE I

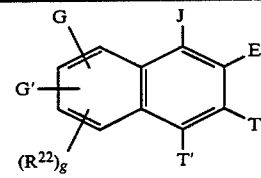

| J | E | T | T' | R$^{22}$ | G | G' | g |
|---|---|---|---|---|---|---|---|
| OH | SH | — | — | — | — | — | 0 |
| — | OH | SH | — | — | — | — | 0 |
| OH | SH | OH | — | — | — | — | 0 |
| SH | OH | OH | — | — | — | — | 0 |
| OH | SH | — | OH | — | — | — | 0 |
| SH | OH | — | SH | — | — | — | 0 |
| OH | SH | — | — | — | OH | SH | 0 |
| OH | SH | OH | OH | — | — | — | 0 |
| OH | SH | — | —CH$_3$ | — | — | — | 0 |
| SH | OH | — | —C$_2$H$_5$ | — | — | — | 0 |
| — | OH | SH | — | —C$_6$H$_{13}$ | — | — | 1 |
| OH | SH | — | —C$_4$H$_9$ | —C$_8$H$_{17}$ | — | — | 2 |
| SH | OH | —C$_4$H$_9$ | — | —C$_4$H$_9$ | OH | — | 1 |
| OH | SH | — | OH | C$_2$H$_3$ | — | — | 1 |
| — | SH | OH | — | C$_{12}$H$_{25}$ | SH | OH | 1 |
| OH | SH | —CH$_3$ | —CH$_3$ | — | — | — | 0 |
| OH | SH | — | — | Cl | — | — | 1 |
| OH | SH | — | Cl | — | — | — | 0 |
| OH | SH | — | Cl | C$_{18}$H$_{35}$ | — | — | 1 |

TABLE I-continued

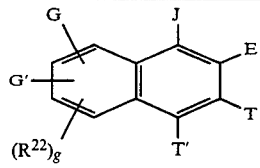

| J | E | T | T' | R$^{22}$ | G | G' | g |
|---|---|---|---|---|---|---|---|
| OH | SH | — | Cl | — | SH | — | 0 |
| —C$_2$H$_5$ | SH | OH | —C$_2$H$_5$ | — | — | — | 0 |
| Cl | OH | SH | Cl | — | — | — | 0 |
| Cl | OH | SH | Cl | — | — | — | 0 |
| OH | SH | — | — | — | OH | OH | 0 |

Examples of organic compounds represented by formula (XII) include, but are not limited to, the compounds shown in the following Table II.

TABLE II

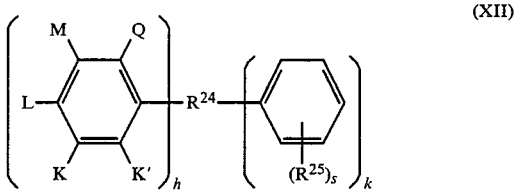

(XII)

| K | K' | L | M | Q | R$^{25}$ | R$^{24}$ | h | k | s |
|---|---|---|---|---|---|---|---|---|---|
| — | — | OH | SH | — | — | CH$_2$ | 1 | 1 | 0 |
| — | — | OH | SH | — | — | CH$_2$ | 2 | 0 | 0 |
| — | — | — | OH | SH | — | CH$_2$ | 2 | 0 | 0 |
| — | — | — | SH | OH | — | CH$_2$ | 2 | 0 | 0 |
| OH | — | SH | OH | — | — | C(CH$_3$)$_2$ | 1 | 1 | 0 |
| SH | OH | — | SH | OH | — | C$_4$H$_8$ | 1 | 1 | 0 |
| — | — | OH | SH | OH | — | C$_2$H$_2$ | 1 | 1 | 0 |
| SH | C$_3$H$_7$ | OH | C$_3$H$_7$ | — | Br | C$_6$H$_{12}$ | 1 | 1 | 2 |
| OH | — | SH | OH | SH | C$_6$H$_{13}$ | CH$_2$ | 1 | 1 | 1 |
| OH | CH$_3$ | SH | — | — | — | CH$_2$ | 2 | 0 | 0 |
| OH | OH | SH | OH | OH | C$_8$H$_{17}$ | CH$_2$ | 1 | 1 | 1 |
| — | — | SH | SH | OH | C$_2$H$_5$ | C(CH$_3$)$_2$ | 1 | 1 | 2 |
| CH$_3$ | — | OH | SH | — | — | CH(CH$_2$)$_3$ | 3 | 0 | 0 |
| — | — | OH | SH | C$_3$H$_7$ | Cl | C$_{10}$H$_{24}$ | 1 | 1 | 1 |
| — | C$_4$H$_9$ | — | SH | OH | — | C(CH$_2$)$_4$ | 4 | 0 | 0 |
| C$_8$H$_{17}$ | — | C$_8$H$_{17}$ | OH | SH | CH$_3$ | C$_4$H$_7$(CH$_3$) | 1 | 1 | 1 |
| — | — | OH | SH | — | OH | C(CH$_3$)$_2$ | 1 | 1 | 1 |

The metal mercaptoalcohols useful in the practice of this invention comprise compounds having at least one tin or antimony atom having bonded directly thereto at least one mercaptoalcohol group through the sulfur of said mercaptoalcohol group. More particularly, the metal mercaptoalcohols of this invention comprise compounds having the formulas:

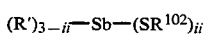  (XIII)

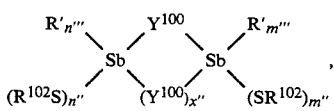  (XIV)

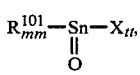  (XV)

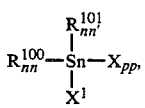  (XVI)

  (XVII)

  (XVIII)

wherein
R' is alkyl, aryl, cycloalkyl, cycloalkenyl, aralkyl, alkaryl or alkenyl;
Y$^{100}$ is selected from the group consisting of

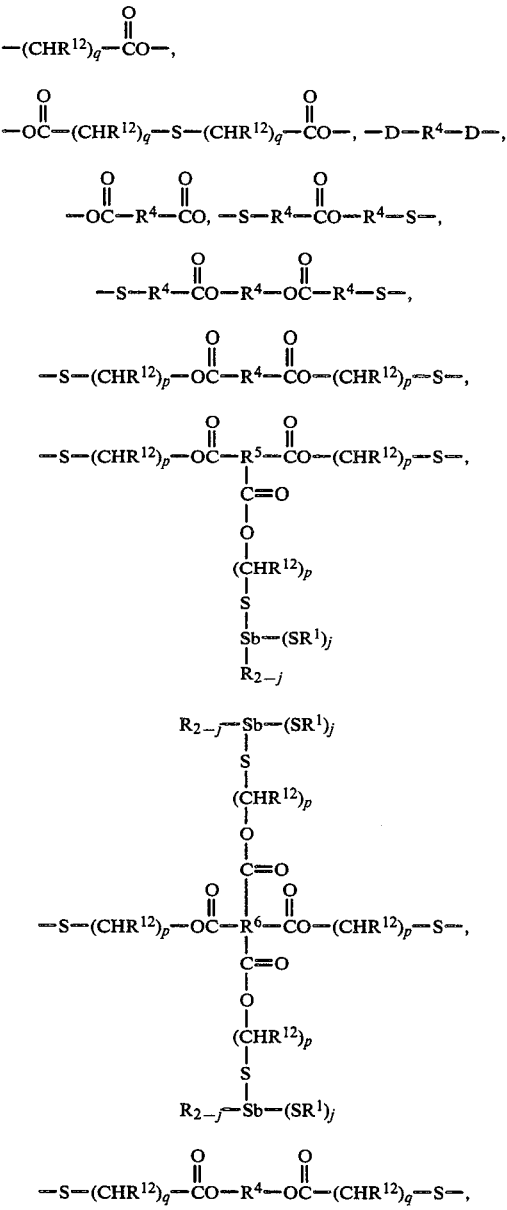

-continued

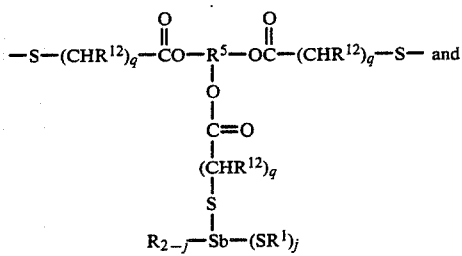

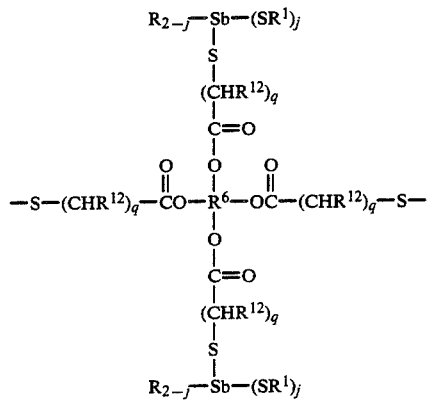

ii=1, 2 or 3;
n''=1 or 2 and n'''=0 or 1;
m''=1 or 2 and m'''=0 or 1;
x''=0 or 1 with the proviso that when x''=0 then m''+m'''=2 and n''+n'''=2, and when x''=1 then m''=1, m'''=0, n''=1 and n'''=0;
$R^{12}$ is as previously defined;
$R^{102}$ is alkyl, alkenyl, aryl, aralkyl, cycloalkyl, cycloalkenyl,

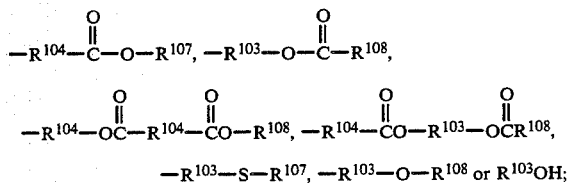

$-R^{103}-S-R^{107}, -R^{103}-O-R^{108}$ or $R^{103}OH$;

X and $X^1$ are the same or different and are selected from $-SR^{102}$, Cl, Br, I, $-O-\overset{O}{\overset{\|}{C}}-R^{108}$, and $-O-R^{108}$;

$Y^{101}$ is $-O-R^{103}-O-$, $-S-R^{103}-S-$, $-S-R^{104}-\overset{O}{\overset{\|}{C}}-O-$, $-S-R^{104}-\overset{O}{\overset{\|}{C}}-O-R^{103}-O-\overset{O}{\overset{\|}{C}}-R^{104}-S-$, $-S-R^{103}-O-\overset{O}{\overset{\|}{C}}-R^{104}-S-$, $-S-R^{103}-O-\overset{O}{\overset{\|}{C}}-R^{106}-\overset{O}{\overset{\|}{C}}-O-R^{103}-S-$, -continued

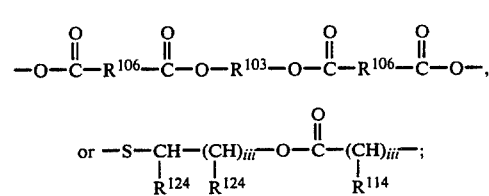

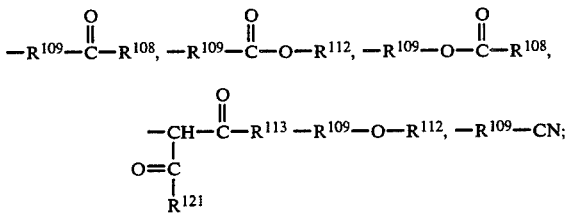

$R^{100}$ and $R^{101}$ are the same or different and are selected from alkyl, aryl, alkenyl, aralkyl, alkaryl, cycloalkyl, cycloalkenyl, $-R^{109}-\overset{O}{\overset{\|}{C}}-R^{108}, -R^{109}-\overset{O}{\overset{\|}{C}}-O-R^{112}, -R^{109}-O-\overset{O}{\overset{\|}{C}}-R^{108},$

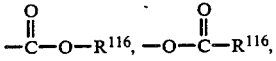
$-R^{109}-O-R^{112}, -R^{109}-CN;$ $R^{103}$ is alkylene of at least 2 carbon atoms, arylene, alkenylene of at least 2 carbon atoms, cycloalkylene, or cycloalkenylene;
$R^{104}$ is alkylene, arylene, alkenylene of at least 2 carbon atoms, cycloalkylene, or cycloalkenylene;
$R^{106}$ is a carbon-carbon single bond or $R^{104}$;
$R^{107}$ is $-H$ or $R^{108}$;
$R^{108}$ is alkyl, alkenyl, aryl, aralkyl, alkaryl, cycloalkyl, or cycloalkenyl;
$R^{109}$ is $C_1$ to $C_4$ alkylene;
$R^{112}$ is $-H$ or a monovalent $C_1$ to $C_{20}$ hydrocarbon radical;
$R^{113}$ and $R^{121}$ are the same or different and are each $C_1$ to $C_{20}$ alkyl or $C_1$ to $C_{20}$ alkoxy;
$R^{114}$ is $-H$, aryl, or $C_1$ to $C_{18}$ alkyl;
$R^{124}$ is $-\overset{O}{\overset{\|}{C}}-O-R^{116}, -O-\overset{O}{\overset{\|}{C}}-R^{116},$ $-OH$, $-SH$, aryl, $C_1$ to $C_{18}$ alkyl or $-H$;
$R^{116}$ is $-H$ or $R^{108}$;
iii=0 or an integer from 1 to 6 inclusive;
mm=0 or 1, tt=1 or 2 with the proviso that mm+tt=2;
nn=0, 1, 2 or 3, nn'=0, 1, 2 or 3, pp=0, 1, 2 or 3 with the proviso that nn+nn'+pp=3;
aa=0, 1 or 2, bb=0, 1 or 2, cc=0, 1 or 2, dd=0 or 2, gg=0, 1 or 2, hh=0, 1 or 2 and qq=0 or an integer from 1 to 4 inclusive with the proviso that aa+bb=2, cc+dd=2 and gg+hh=2;
ww=0, 1 or 2, xx=0 or 1, yy=0 or 1 and zz=1 or 2 with the proviso that when xx=0 then yy+zz=2, when xx=1 then yy+zz=1 and ww=1, when ww=2 then xx=0, and when ww=0 then xx=0, yy+zz=2 and $Y^{101}$ is $-D-R^{103}-D-$, or

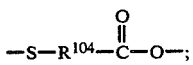

with the proviso that at least one $R^{102}$ in formulas XIII and XIV is —$R^{103}$OH, and at least one X or $X^1$ in each of formulas XV–XVIII is —$SR^{102}$ where $R^{102}$ is —$R^{103}$OH.

The preferred metal mercaptoalcohols are:
$CH_3Sn(SCH_2CH_2OH)_3$ and
$Sb(SCH_2CH_2OH)_3$ Examples of the metal mercaptoalcohols according to formula (XIII) include, but are not limited to, the following compounds:

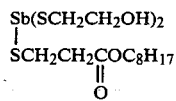

$Sb(SCH_2CH_2OH)_3$

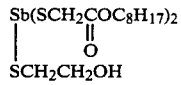

The metal mercaptoalcohols according to the formula XIV are exemplified by, but are not limited to, the compounds shown below:

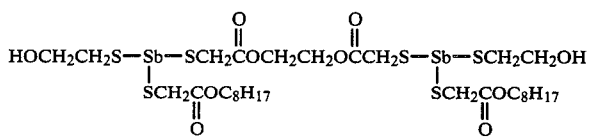

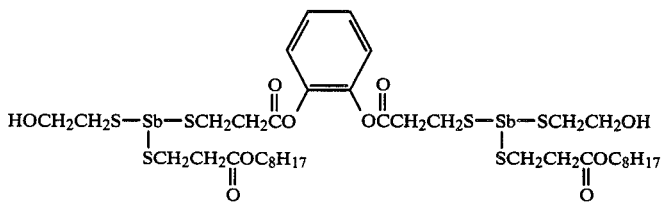

The compounds shown below illustrate some, but not all, of the metal mercaptoalcohols according to formula XV.

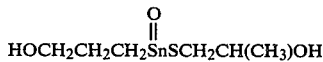

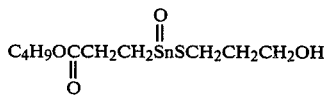

Examples of metal mercaptoalcohols according to formula XVI include, but are not limited to, the compounds illustrated below:

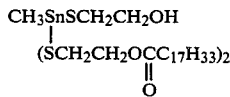

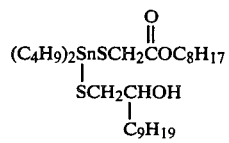

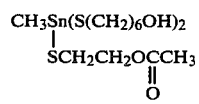

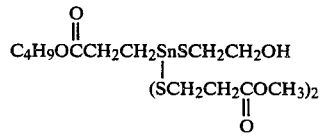

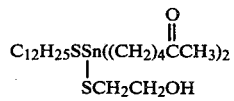

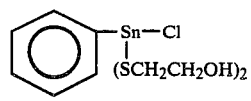

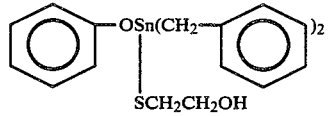

$Sn(SCH_2CH_2OH)_4$
$CH_3Sn(SCH_2CH_2OH)_3$

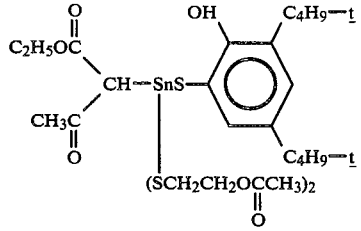

-continued

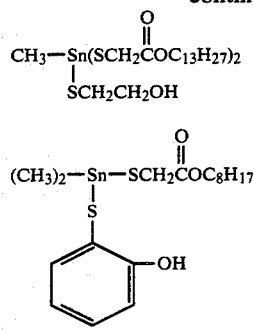

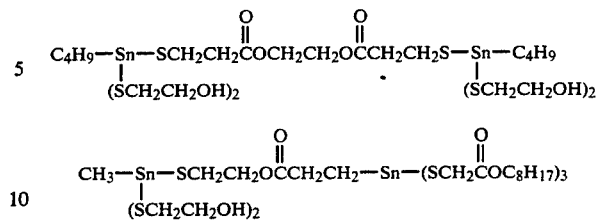

The following compounds illustrate some, but not all, of the metal mercaptoalcohols according to formula XVIII:

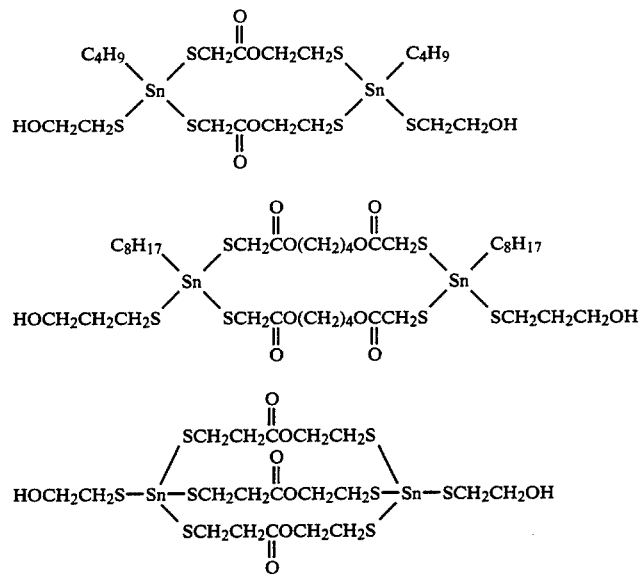

Examples of metal mercaptoalcohols according to formula XVII include, but are not limited to, the following compounds:

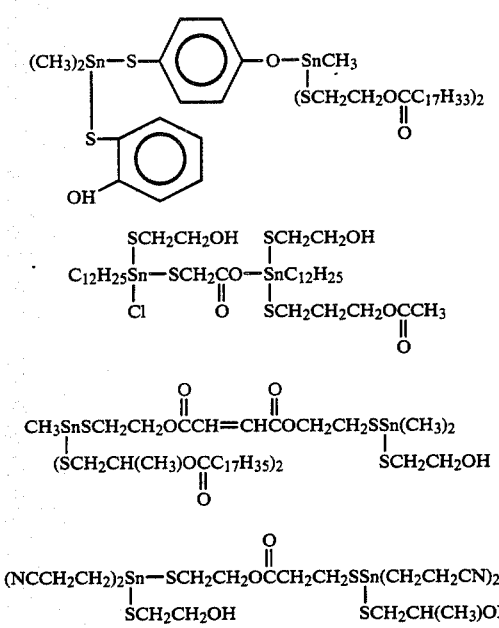

As used throughout this specification, the radicals —$C_4H_9$, —$C_8H_{17}$, —$C_{12}H_{25}$, —$C_9H_{19}$ and —$C_{10}H_{21}$ represent n-butyl, n-octyl, n-dodecyl, n-nonyl and n-decyl respectively. The carboxyl radicals

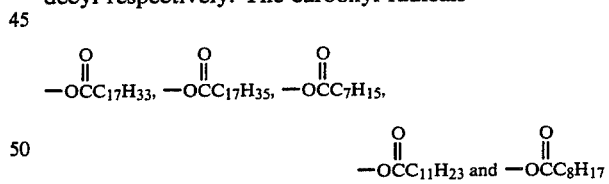

are derived from oleic acid, stearic acid, n-octanoic acid, lauric acid, and pelargonic acid respectively. Likewise, the radicals —$OC_{13}H_{27}$, —$OC_{18}H_{37}$, and —$OC_8H_{17}$ are derived from tridecanol, stearyl alcohol and iso-octanol respectively.

The stabilizer compositions of this invention may be prepared by blending the components thereof in any convenient manner which produces a homogeneous mixture, such as by shaking or stirring in a container. Likewise, the stabilizer compositions of this invention can be incorporated into the halogen-containing organic polymer by admixing the stabilizer composition and polymer, such as, for example, in an appropriate mill or mixer or by any other of the well-known methods which provide uniform distribution of the stabilizer throughout the polymer.

As previously stated, the stabilizer compositions of the present invention comprise (1) an organic antimony compound or mixture of organic antimony compounds, (2) a mercaptan-containing organic compound or mixture of mercaptan-containing organic compounds, and (3) a metal mercaptoalcohol or mixture of metal mercaptoalcohols. Each of the components of the stabilizer compositions of this invention are employed in amounts such that the resulting stabilizer is synergistically active. More particularly, the stabilizer compositions of this invention contain about 5% to about 95%, preferably about 20% to about 80% of organic antimony compound or mixture of organic antimony compounds, about 1% to about 60%, preferably about 20% to about 50% mercaptan-containing organic compound or mixture of mercaptan-containing organic compounds and about 1% to about 60%, preferably about 50% to 50% metal mercaptoalcohol or mixture of metal mercaptoalcohols, all percentages being by weight based on the total weight of the stabilizer composition.

The stabilizer compositions of this invention are employed in an effective stabilizing amount sufficient to impart the desired resistance to heat deterioration to halogen-containing organic polymers. It will be readily apparent to one of ordinary skill in the art, that the precise amount of stabilizer composition used will depend upon several factors, including, but not limited to, the particular halogen-containing organic polymer employed, the temperature to which the polymer will be subjected, and the possible presence of other stabilizing compounds. In general, the more severe the conditions to which the halogen-containing organic polymer is subjected, and the longer the term required for resisting degradation, the greater will be the amount of stabilizer composition required. Generally, as little as about 0.40 parts by weight of the stabilizer composition per hundred parts by weight of halogen-containing organic polymer will be effective in stabilizing the polymer. While there is no critical upper limit to the amount of stabilizer composition which can be employed, amounts in excess of about 10 parts by weight of stabilizer composition per hundred parts by weight of halogen-containing organic polymer do not give an increase in effectiveness commensurate with the additional amount of stabilizer employed.

The stabilized halogen-containing organic polymer compositions of this invention may be used to form articles of manufacture, e.g. pipe. A variety of conventional molding techniques may be employed to form the stabilized compositions into any desired shape.

The following examples illustrate this invention, but are not intended to limit it in any manner. Unless otherwise indicated, all parts and percentages in the examples and throughout this specification are by weight.

EXAMPLES 1–11

Several mixtures are prepared by dry blending to 110° C. in a Henschel high intensity mixer (Model 2JSS) 100.0 parts of polyvinyl chloride (Geon ®103 EP-F-76 available commercially from B. F. Goodrich Chemical Company) with 3.0 parts of fine particle size calcium carbonate coated with calcium stearate, 1.0 parts titanium dioxide, 1.2 parts paraffin wax (ADVAWAX® 165 paraffin wax available commercially from Carstab Corporation), 0.60 part calcium stearate, 0.15 part of an oxidized low molecular weight ethylene homopolymer (AC629A available commercially from Allied Chemical Corporation), and each in turn of the stabilizer compositions listed in Table A in the amounts indicated in Table A, said amounts being parts by weight of stabilizer per hundred parts polyvinyl chloride. The resulting mixture is masticated on a two-roll mill at about 193° C. Samples are taken at one minute intervals beginning after the first introduction of the mix to the mill.

The appearance of each sample taken from the mill is evaluated using the following scale:

| 10    | 9 | 8 | 7 | 6 | 5          | 4 | 3 | 2 | 1 | 0    |
|-------|---|---|---|---|------------|---|---|---|---|------|
| White |   |   |   |   | Tan-Orange |   |   |   |   | Burn |

The results of these tests are indicated in Table A.

TABLE A

| Example No. | Stabilizer Composition | Parts by Weight | \multicolumn{10}{c}{Minutes of Milling / COLOR} | | | | | | | | | |
|---|---|---|---|---|---|---|---|---|---|---|---|---|
| | | | 1 | 2 | 3 | 4 | 5 | 6 | 7 | 8 | 9 | 10 |
| 1* | $Sb(SCH_2\overset{O}{\overset{\|}{C}}OC_8H_{17})_3$ | 0.30 | 10 | 10 | 9 | 9 | 8 | 7 | 6 | 5 | 4 | 3 |
| 2* | $Sb(SCH_2\overset{O}{\overset{\|}{C}}OC_8H_{17})_3$ | 0.20 | 10 | 10 | 10 | 10 | 9 | 8 | 6 | 5 | 4 | 2 |
|    | $HSCH_2\overset{O}{\overset{\|}{C}}OC_8H_{17}$ | 0.10 | | | | | | | | | | |
| 3  | $Sb(SCH_2\overset{O}{\overset{\|}{C}}OC_8H_{17})_3$ | 0.30 | 10+ | 10+ | 10+ | 10 | | 10 | 8 | 7 | 6 | 4 | 3 |
|    | $HSCH_2CH_2O\overset{O}{\overset{\|}{C}}C_{17}H_{33}$ | 0.10 | | | | | | | | | | |
|    | $Sn(SCH_2CH_2OH)_4$ | 0.05 | | | | | | | | | | |
| 4  | $Sb(SCH_2\overset{O}{\overset{\|}{C}}OC_8H_{17})_3$ | 0.30 | 10+ | 10+ | 10 | 10 | 9 | 8 | 8 | 6 | 5 | 3 |
|    | $HSCH_2CH_2O\overset{O}{\overset{\|}{C}}C_{17}H_{33}$ | 0.10 | | | | | | | | | | |

TABLE A-continued

| Example No. | Stabilizer Composition | Parts by Weight | Minutes of Milling / COLOR |||||||||||
|---|---|---|---|---|---|---|---|---|---|---|---|---|
| | | | 1 | 2 | 3 | 4 | 5 | 6 | 7 | 8 | 9 | 10 |
| | Sb(SCH$_2$CH$_2$OH)$_3$ | 0.05 | | | | | | | | | | |
| 5 | Sb(SCH$_2$COC$_8$H$_{17}$)$_3$ (C=O) | 0.20 | 10+ | 10+ | 10+ | 10+ | 10 | 9 | 7 | 6 | 5 | 4 |
| | HSCH$_2$COC$_8$H$_{17}$ (C=O) | 0.10 | | | | | | | | | | |
| | CH$_3$Sn(SCH$_2$CH$_2$OH)$_3$ | 0.01 | | | | | | | | | | |
| 6* | (C$_{18}$H$_{37}$OCCH$_2$S)$_2$Sb—O— / (C$_{18}$H$_{37}$OCCH$_2$S)$_2$Sb—O— aromatic ring with t-C$_4$H$_9$ | 0.30 | 10+ | 10+ | 10 | 10 | 9 | 7 | 7 | 6 | 4 | 3 |
| | HSCHCOC$_{12}$H$_{25}$ \| CH$_3$ | 0.10 | | | | | | | | | | |
| 7 | (C$_{18}$H$_{37}$OCCH$_2$S)$_2$Sb—O— / (C$_{18}$H$_{37}$OCCH$_2$S)$_2$Sb—O— aromatic ring with t-C$_4$H$_9$ | 0.30 | 10+ | 10+ | 10+ | 10+ | 10 | 9 | 8 | 7 | 6 | 4 |
| | HSCHCOC$_{12}$H$_{25}$ \| CH$_3$ | 0.10 | | | | | | | | | | |
| | (C$_4$H$_9$)$_2$SnSCH$_2$COC$_8$H$_{17}$ \| SCHCH$_2$OH \| C$_9$H$_{19}$ | 0.06 | | | | | | | | | | |
| 8* | Sb—SCH$_2$CO(CH$_2$)$_4$OCCH$_2$S—Sb \| (SCH$_2$COCH$_3$)$_2$  (CH$_3$OCCH$_2$S)$_2$ | 0.30 | 10+ | 10 | 10 | 9 | 8 | 8 | 6 | 5 | 4 | 2 |
| | HSCH$_2$COH | 0.30 | | | | | | | | | | |
| 9 | Sb—SCH$_2$CO(CH$_2$)$_4$OCCH$_2$S—Sb \| (SCH$_2$COCH$_3$)$_2$  (CH$_3$OCCH$_2$S)$_2$ | 0.30 | 10+ | 10+ | 10+ | 10 | 10 | 8 | 8 | 7 | 5 | 4 |
| | HSCH$_2$COH | 0.03 | | | | | | | | | | |

TABLE A-continued

| Example No. | Stabilizer Composition | Parts by Weight | 1 | 2 | 3 | 4 | 5 | 6 | 7 | 8 | 9 | 10 |
|---|---|---|---|---|---|---|---|---|---|---|---|---|
| | (CH$_3$)$_2$Sn—S—⟨phenyl⟩—O—SnCH$_3$ / (SCH$_2$CH$_2$OCC$_{17}$H$_{33}$)$_2$ with S—⟨phenyl-OH⟩ branch | 0.03 | | | | | | | | | | |
| 10* | Sb(SCH$_2$CH$_2$COC$_8$H$_{17}$)$_3$ | 0.20 | 10 | 10 | 10 | 10 | 9 | 8 | 6 | 5 | 4 | 2 |
| | HSCH$_2$COC$_8$H$_{17}$ | 0.10 | | | | | | | | | | |
| 11 | Sb(SCH$_2$CH$_2$COC$_8$H$_{17}$)$_3$ | 0.20 | 10+ | 10+ | 10 | 10 | 9 | 8 | 7 | 6 | 4 | 2 |
| | HSCH$_2$COC$_8$H$_{17}$ | 0.10 | | | | | | | | | | |
| | Sb(SCH$_2$CH$_2$OH)$_2$ | SCH$_2$COC$_8$H$_{17}$ | 0.30 | | | | | | | | | | |

*For comparison purposes only

Other features, advantages and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while a few specific embodiments of this invention have been described in considerable detail, variations and modifications of these embodiments can be effected without departing from the spirit and scope of the invention as disclosed and claimed.

What we claim and desire to protect by Letters Patent is:

1. A composition for stabilizing halogen-containing organic polymers against the deteriorative effects of heat comprising, in amounts such that the resulting stabilizer is synergistically active:
   A. an organic antimony compound or mixture of organic antimony compounds having at least one antimony atom and at least one antimony to sulfur to carbon linkage wherein the sulfur to carbon part of each antimony to sulfur to carbon linkage is derived from the group consisting of mercaptides, mercapto acids, mercaptoesters or mercaptoalkyl esters of carboxylic acids and combinations thereof;
   B. an organic mercaptan-containing compound or mixture of organic mercaptan containing compounds selected from the group consisting of hydrocarbyl mercaptan, mercaptoesters, mercaptoalcohols, mercapto acids and mercaptoalkyl esters of carboxylic acids; and
   C. a metal mercaptoalcohol or mixture of metal mercaptoalcohols having at least one non-benzylic tin or antimony atom having bonded directly thereto at least one mercaptoalcohol group through the sulfur of said mercaptoalcohol group.

2. A stabilizer composition for halogen containing organic polymer comprising, in amounts such that the resulting stabilizer is synergistically active:
   A. an organic antimony compound or mixture of organic antimony compounds selected from compounds having the formulas:

$$(R)_{3-i}Sb\text{—}(\text{—}SR^1)_i \quad \text{(I)}$$

or the formula

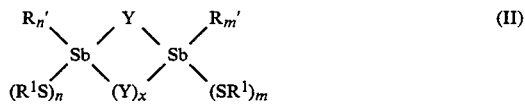

$$\quad \text{(II)}$$

wherein
R is selected from the group consisting of alkyl, aryl, cycloalkyl, cycloalkenyl, aralkyl, alkaryl, and alkenyl;
R$^1$ is selected from the group consisting of alkyl, aryl, cycloalkyl, cycloalkenyl, aralkyl, alkaryl, alkenyl, $$-(CHR^{12})_z\text{—}COOR^2, -(CHR^{12})_a\text{—}OCR^3;$$

$$-R^4\text{—}OC\text{—}R^4\text{—}COR^2, -R^4\text{—}CO\text{—}R^4\text{—}OCR^2,$$

$$-R^4\text{—}S\text{—}R^2 \text{ and } -R^4\text{—}O\text{—}R^3;$$

R$^2$ is hydrogen, alkyl, aryl, alkenyl, cycloalkyl or alkoxyalkyl;

$R^3$ is alkyl, aryl, cycloalkyl or alkenyl;

$R^{12}$ is —H, alkyl, aryl, alkenyl, cycloalkyl; or alkyl, aryl, alkenyl or cycloalkyl substituted with —OH, —OR$^1$,

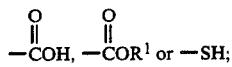

Y is selected from the group consisting of

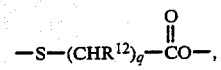

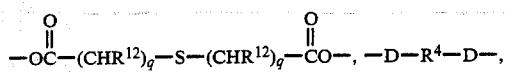

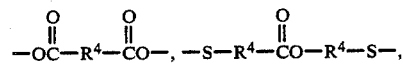

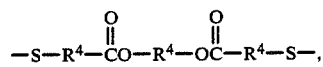

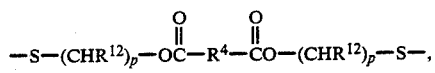

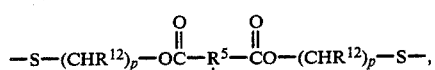

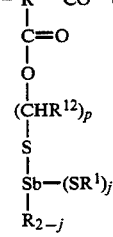

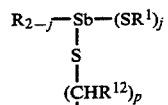

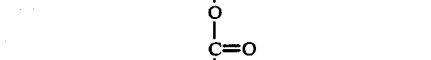

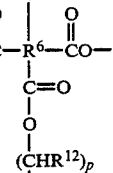

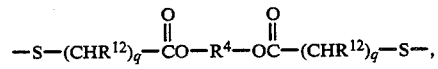

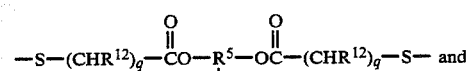 and

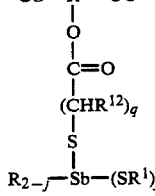

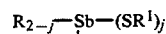

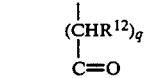

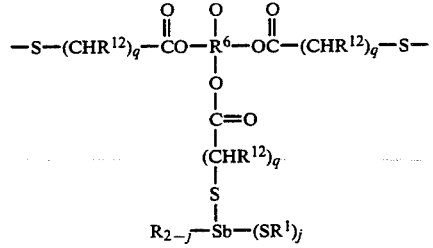

$R^4$ is unsubstituted alkylene, arylene or alkenylene, or alkylene, arylene or alkenylene substituted with one or two R, —OR$^2$,

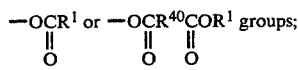

$R^5$ is a trivalent alkyl or aryl radical;
$R^6$ is a tetravalent alkyl or aryl radical;
$R^{40}$ is unsubstituted alkylene, arylene or alkenylene; or alkylene substituted with one or two —OR$^2$ or

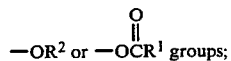

D is oxygen or sulfur;
i = 1, 2 or 3,
j = 1 or 2;
m = 1 or 2 and m' = 0 or 1;
n = 1 or 2 and n' = 0 or 1;
x is 0 or 1 with the proviso that when x = 0 then m+m' = 2 and n+n' = 2, and when x = 1 then m = 1, m' = 0, n = 1 and n' = 0;
z is 1, 2 or 3;
a is 2, 3 or 4;
q is 1, 2 or 3; and
p is 2, 3 or 4; and B. an organic mercaptan-containing compound or mixture of organic mercaptan-containing compounds having the formulas:

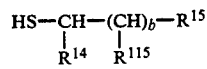 (III)

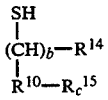 (IV)

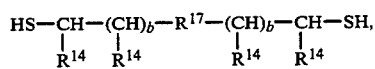 (V)

-continued

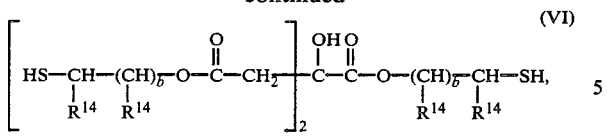 (VI)

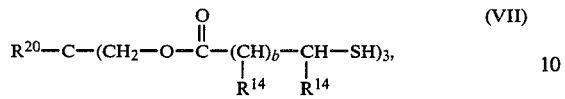 (VII)

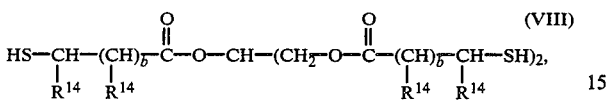 (VIII)

 (IX)

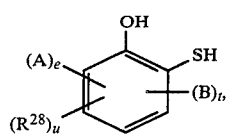 (X)

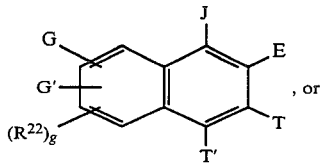 (XI)

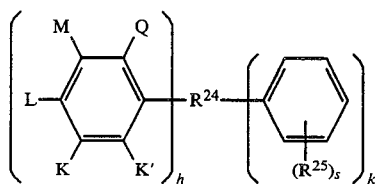 (XII)

wherein
$R^{10}$ is cycloalkyl, cycloalkenyl or aryl;
$R^{14}$ is —H, aryl or $C_1$ to $C_{18}$ alkyl;
$R^{15}$ and $R^{115}$ are each

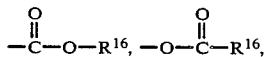

—OH, —SH, aryl, $C_1$ to $C_{18}$ alkyl, or —H;
$R^{16}$ is —H, alkyl, alkenyl, aryl, aralkyl, alkaryl, cycloalkyl or cycloalkenyl;
$R^{17}$ is

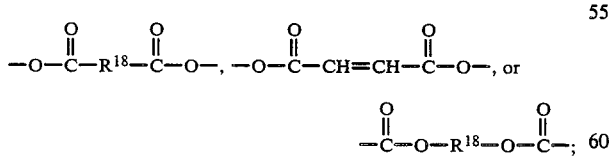

$R^{18}$ is arylene, $C_1$ to $C_8$ alkylene, or

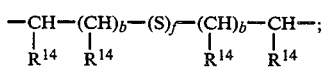

$R^{20}$ is —CH$_3$, —CH$_2$CH$_3$, or

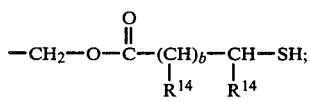

$R^{22}$ is alkyl, alkenyl or halogen;
$R^{24}$ is alkylene or alkenylene;
$R^{25}$ is alkyl, alkenyl, halogen, —SH or —OH;
$R^{27}$ is unsubstituted alkylene, arylene, or alkenylene, or alkylene, arylene, or alkenylene substituted with one or two R, —R$^1$, —OR$^2$,

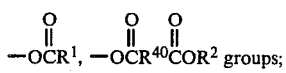 groups;

R, $R^1$, $R^2$ and $R^{40}$ are as previously defined;
$R^{28}$ is alkyl, aryl, alkenyl, alkaryl, cycloalkyl, alkoxy or halogen;
$R^{29}$ is $R^{27}$;
A is —H, —OH or —SH;
B is —H, —OH or —SH;
J is —H, —SH, —OH or $R^{26}$;
E is —H, —OH, —SH or $R^{26}$;
T is —H, —SH, —OH or $R^{26}$;
T' is —H, —OH, —SH or $R^{26}$;
$R^{26}$ is alkyl, alkenyl or halogen;
G is —H, —OH or —SH;
G' is —H, —SH or —OH;
K is —H, —SH, —OH or $R^{23}$;
K' is —H, —OH, —SH or $R^{23}$;
L is —H, —SH, —OH or $R^{23}$;
M is —H, —SH, —OH or $R^{23}$;
Q is H, —SH, —OH or $R^{23}$;
$R^{23}$ is alkyl, alkenyl or halogen;
b=0 or an integer from 1 to 6 inclusive;
c=0, 1, 2 or 3;
e=1 or 2;
f=1 or 2;
g=0, 1, 2, or 3;
h=1, 2, 3 or 4;
k=0, 1, 2 or 3;
s=0, 1, 2 or 3;
t=1 or 2;
u=0, 1, 2 or 3;
h+k=2, 3 or 4;
e+t+u=2, 3 or 4;
with the proviso that (1) in formula (XI) two of groups J, E, T and T' must be an —OH group and an —SH group bonded directly to adjacent ring carbon atoms, (2) in formula (XII) two of groups K, K', L, M and Q must be an —OH group and an —SH group bonded directly to adjacent ring carbon atoms, and (3) in formula (IV) when $R^{10}$ is aryl, b=0, $R^{15}$ is —OH and c=1, 2 or 3, then the —OH and —SH groups on the aryl are on non-adjacent carbon atoms; and C. a metal mercaptoalcohol or mixture of metal mercaptoalcohols having the formulas:

 (XIII)

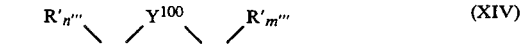 (XIV)

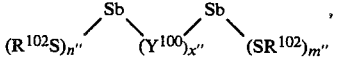

-continued

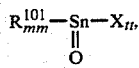 (XV)

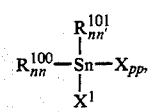 (XVI)

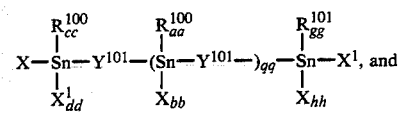 (XVII)

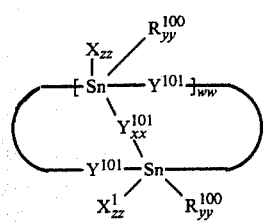 (XVIII)

wherein

R' is alkyl, aryl, cycloalkyl, cycloalkenyl, aralkyl, alkaryl or alkenyl;

$y^{100}$ is selected from the group consisting of

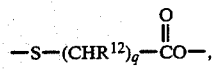

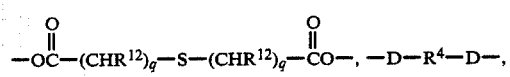

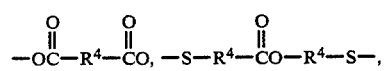

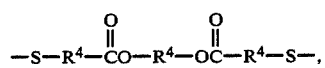

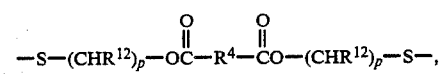

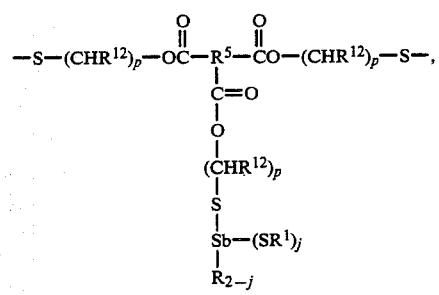

-continued

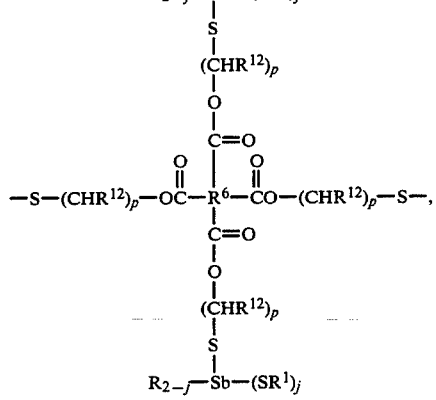

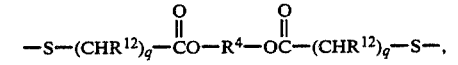

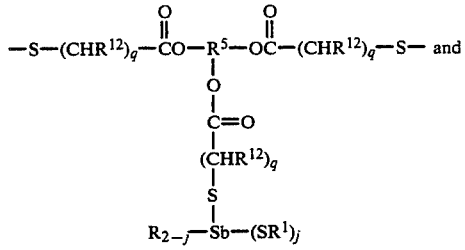

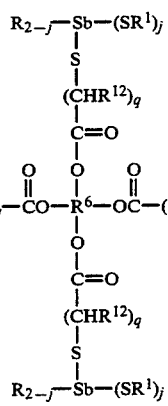

ii = 1, 2 or 3;
n" = 1 or 2 and n'" = 0 or 1;
m" = 1 or 2 and m'" = 0 or 1;
x" = 0 or 1 with the proviso that when x" = 0 then m" + m'" = 2 and n" + n'" = 2, and when x" = 1 then m" = 1, m'" = 0, n" = 1 and n'" = 0;
$R^{12}$ is as previously defined;
$R^{102}$ is alkyl, alkenyl, aryl, aralkyl, cycloalkyl, cycloalkenyl,

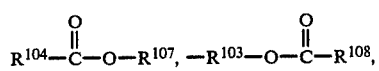

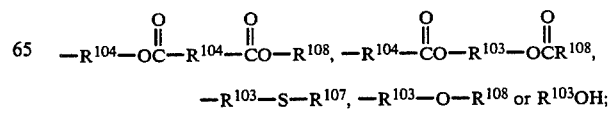

X and $X^1$ are the same or different and are selected from

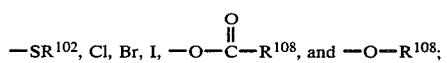

$Y^{101}$ is $-O-R^{103}-O-$, $-S-R^{103}-S-$,

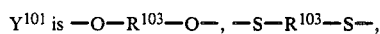

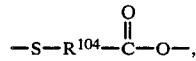

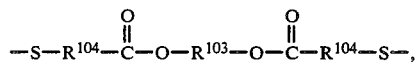

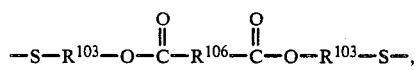

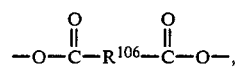

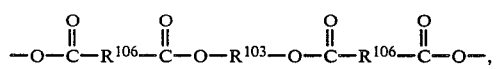

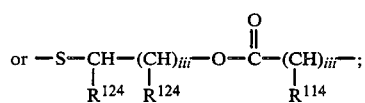

$R^{100}$ and $R^{101}$ are the same or different and are selected from alkyl, aryl, alkenyl, aralkyl, alkaryl, cycloalkyl, cycloalkenyl,

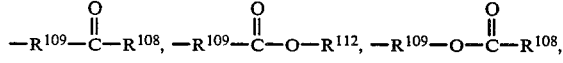

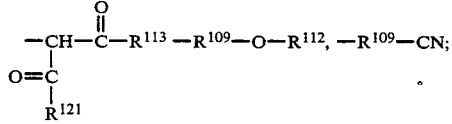

$R^{103}$ is alkylene of at least 2 carbon atoms, arylene, alkenylene of at least 2 carbon atoms, cycloalkylene, or cycloalkenylene;

$R^{104}$ is alkylene, arylene, alkenylene of at least 2 carbon atoms, cycloalkylene, or cycloalkenylene;

$R^{106}$ is a carbon-carbon single bond or $R^{104}$;

$R^{107}$ is $-H$ or $R^{108}$;

$R^{108}$ is alkyl, alkenyl, aryl, aralkyl, alkaryl, cycloalkyl, or cycloalkenyl;

$R^{109}$ is $C_1$ to $C_4$ alkylene;

$R^{112}$ is $-H$ or a monovalent $C_1$ to $C_{20}$ hydrocarbon radical;

$R^{113}$ and $R^{121}$ are the same or different and are each $C_1$ to $C_{20}$ alkyl or $C_1$ to $C_{20}$ alkoxy;

$R^{114}$ is $-H$, aryl, or $C_1$ to $C_{18}$ alkyl;

$R^{124}$ is

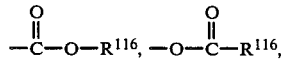

$-OH$, $-SH$, aryl, $C_1$ to $C_{18}$ alkyl or $-H$;

$R^{116}$ is $-H$ or $R^{108}$;

iii = 0 or an integer from 1 to 6 inclusive;

mm = 0 or 1, tt = 1 or 2 with the proviso that mm + tt = 2;

nn = 0, 1, 2 or 3, nn' = 0, 1, 2 or 3, pp = 0, 1, 2 or 3 with the proviso that nn + nn' + pp = 3;

aa = 0, 1 or 2, bb = 0, 1 or 2, cc = 0, 1 or 2, dd = 0, 1 or 2, gg = 0, 1 or 2, hh = 0, 1 or 2 and qq = 0 or an integer from 1 to 4 inclusive with the proviso that aa + bb = 2, cc + dd = 2 and gg + hh = 2;

ww = 0, 1 or 2, xx = 0 or 1, yy = 0 or 1 and zz = 1 or 2 with the proviso that when xx = 0 then yy + zz = 2, when xx = 1 then yy + zz = 1 and ww = 1, when ww = 2 then xx = 0, and when ww = 0 then xx = 0, yy + zz = 2 and $y^{101}$ is $-D-R^{103}-D-$, or

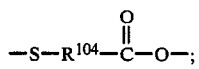

with the proviso that at least one $R^{102}$ in formulas XIII and XIV is $-R^{103}OH$, and at least one X or $X^1$ in each of formulas XV–XVIII is $-SR^{102}$ where $R^{102}$ is $-R^{103}OH$.

3. A stabilizer composition according to claim 2 wherein the organic antimony compound or mixture of organic antimony compounds is according to formula (I) wherein i=3 and $R^1$ is $-(CHR^{12})_z COOR^2$ where $R^{12}$ is $-H$ or alkyl, z=1 or 2 and $R^2$ is alkyl.

4. A stabilizer composition according to claim 2 wherein the organic mercaptan-containing compound or mixture of organic mercaptan-containing compounds is according to formula (III) where $R^{14}$ is $-H$, b=o and $R^{15}$ is

where $R^{16}$ is alkyl.

5. A composition according to claim 1 wherein the composition comprises about 20% to about 80% organic antimony compound or mixture of organic antimony compounds, about 20% to about 50% organic mercaptan-containing compound or mixture of organic mercaptan-containing compounds, and about 5% to about 50% metal mercaptoalcohol or mixture of metal mercaptoalcohols, all percentages being by weight based on the total weight of the composition.

6. A composition according to claim 2 wherein the composition comprises about 20% to about 80% organic antimony compound or mixture of organic antimony compounds, about 20% to about 50% organic mercaptan-containing compound or mixture of organic mercaptan-containing compounds, and about 5% to about 50% metal mercaptoalcohol or mixture of metal mercaptoalcohols, all percentages being by weight based on the total weight of the composition.

7. A polymer composition comprising a halogen-containing organic polymer normally susceptible to heat induced deterioration, and an effective amount of the stabilizer composition according to claim 1.

8. A pipe comprising a halogen-containing organic polymer normally susceptible to heat induced deterioration and an effective amount of the stabilizer composition according to claim 1.

* * * * *

UNITED STATES PATENT AND TRADEMARK OFFICE
CERTIFICATE OF CORRECTION

PATENT NO. : 4,617,334

DATED : Oct. 14, 1986

INVENTOR(S) : Thomas G. Kugele; Keith A. Mesch; and Karl R. Wursthorn

It is certified that error appears in the above-identified patent and that said Letters Patent is hereby corrected as shown below:

Column 10, line 7, should read --c = 0, 1, 2 or 3;--

Column 10, line 10, "grou" should be --group--.

Column 15, line 13-14, duplication, delete line 14.

Column 30, line 32-37, "-$OR^2$ or " is duplicated, delete first instance.

Signed and Sealed this

Twenty-sixth Day of November, 1991

*Attest:*

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,617,334
DATED : October 14, 1986
INVENTOR(S) : Thomas G. Kugele, Keith A. Mesch, and Karl R. Wursthorn It is certified that error appears in the above-identified patent and that said Letters Patent is hereby corrected as shown below:

Column 27, Claim 1, line 67, delete "non-benzlic".

Column 28, Claim 1, line 33, after "mercaptoalcohol", insert "non-benzlic"

Signed and Sealed this

Twenty-first Day of September, 1993

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 4,617,334
DATED : October 14, 1986
INVENTOR(S) : Kugele et al.

It is certified that error appears in the above-identified patent and that said Letters Patent is hereby corrected as shown below:

At column 28, line 33, "one mercaptoalcohol non-benzlic" should be -- one non-benzylic mercaptoalcohol --.

Signed and Sealed this

Seventh Day of June, 1994

Attest:

BRUCE LEHMAN

*Attesting Officer*   Commissioner of Patents and Trademarks